United States Patent [19]
Jaiswal et al.

[11] Patent Number: 6,002,754
[45] Date of Patent: Dec. 14, 1999

[54] BILLING FORMATTER FOR TELEPHONE SYSTEMS UTILIZING INTELLIGENT PERIPHERALS IN ADVANCED INTELLIGENT NETWORK

[75] Inventors: Peeyush Jaiswal; Shailesh Gandhi, both of Boca Raton, Fla.; Vanessa Vincenzi Michelini, Campinas, Brazil

[73] Assignee: International Business Machines Corp., Armonk, N.Y.

[21] Appl. No.: 08/978,184

[22] Filed: Nov. 25, 1997

[51] Int. Cl.⁶ .................................................. H04M 15/00
[52] U.S. Cl. ........................... 379/115; 379/112; 379/207
[58] Field of Search .................................. 379/111, 112, 379/114, 115, 121, 127, 201, 207, 219, 220, 67.1, 88.17

[56] References Cited

U.S. PATENT DOCUMENTS

| | | | |
|---|---|---|---|
| 5,511,113 | 4/1996 | Tasaki et al. | 379/112 |
| 5,517,560 | 5/1996 | Greenspan | 379/114 |
| 5,793,853 | 8/1998 | Sbisa | 379/115 |

OTHER PUBLICATIONS

Peeyush Jaiswal et al., Ser. No. 08/978,091 "Billing Formatter for Telephone Systems Which Include Intellignet Peripherals in Advanced Intelligent Network", Nov. 1997.

Deborah Acker et al.—US Ser. No. 08/792,018—"Multi Service Platform Architecture for Telephone Networks", Feb. 1997.

*Primary Examiner*—Paul Loomis
*Attorney, Agent, or Firm*—Gunster, Yoakley, Valdes-Fauli & Stewart, P.A.; Jon A. Gibbons

[57] ABSTRACT

A billing processing method is disclosed for a telephone system comprising at least one central office switching system, wherein a peripheral subsystem is connected to the central office switching systems via a call connection channel, the peripheral subsystem comprising means for providing at least one auxiliary call processing capability via the call connection channel; and the peripheral subsystem comprising means for providing billing information out to a central office communication network. The billing processing method comprising the steps of: (1) receiving raw billing data from the peripheral subsystem; (2) associating the raw billing data with a formatting object; (3) converting the raw billing data as specified in the formatting object into a formatted data object; and (4) outputting the data object to the central office communication network.

6 Claims, 8 Drawing Sheets

|  | INFORMATION | TABLE NUMBER | NUMBER OF CHARACTERS |
|---|---|---|---|
| HEADER | RECORD DESCRIPTOR WORD | '000 | 4 |
| HEADER | HEX ID | '00 | 2 |
| HEADER | STRUCTURE CODE | 0 | 6 |
| HEADER | CALL TYPE | 1 | 4 |
| HEADER | SENSOR TYPE | 2 | 4 |
| HEADER | SENSOR ID | 3 | 8 |
| HEADER | RECORDING OFFICE TYPE | 4 | 4 |
| HEADER | RECORDING OFFICE ID | 5 | 8 |
| MANDATORY | DATE OF TRANSACTION | 6 | 6 |
| ELEMENT | TIMING INDICATOR | 7 | 6 |
| ELEMENT | STUDY INDICATOR | 8 | 8 |
| MANDATORY | CONNECT TIME | 18 | 8 |
| MANDATORY | ELAPSED TIME | 19 | 10 |
| MANDATORY | SERVICE LOGIC ID | 77 | 10 |
| ELEMENT | COMPLETION INDICATOR | 280 | 4 |
| MANDATORY | SUBSCRIBER ID | 25 | 12 |
| ELEMENT | SIGNIFICANT DIGITS | 55 | 4 |

*FIG. 8*

|  | INFORMATION | TABLE NUMBER | NUMBER OF CHARACTERS |
|---|---|---|---|
| HEADER | MODULE CODE | 88 | 4 |
| MANDATORY | ORIGINATING NPA | 13 | 4 |
| MANDATORY | ORIGINATING NUMBER | 14 | 8 |
| ELEMENT | OVERSEAS NPA DIALING INDICATOR | 15 | 2 |
| MANDATORY | TERMINATING NPA | 16 | 6 |
| MANDATORY | TERMINATING NUMBER | 17 | 8 |
| ELEMENT | COMPLETION INDICATOR | 280 | 4 |
| MANDATORY | RATE/SERVICE INDICATOR | 540 | 4 |
| ELEMENT | RATE CENTER NPA-NXX | 81 | 8 |
| MANDATORY | CONNECT TIME | 18 | 8 |
| MANDATORY | ELAPSED TIME | 19 | 10 |
| ELEMENT | IC/INC IDENTIFICATION | 57 | 6 |
| ELEMENT | TRANSACTION CODE/BOC SETTABLE | 541 | 16 |
|  | TOTAL |  | 92 |

*FIG. 9*

|  | INFORMATION | TABLE NUMBER | NUMBER OF CHARACTERS |
|---|---|---|---|
| HEADER | MODULE CODE | 88 | 4 |
| ELEMENT | BILLING TYPE ID | 117 | 2 |
| ELEMENT | SIGNIFICANT DIGITS NF | 55 | 4 |
| ELEMENT | ALTERNATE BILLING-DIGITS 1 | 401 | 12 |
| ELEMENT | ALTERNATE BILLING-DIGITS 2 | 402 | 10 |
| ELEMENT | RAO NUMBER | 46 | 4 |
| ELEMENT | CALLING CARD SUBACCOUNT | 289 | 4 |
| ELEMENT | TREATMENT INDICATOR | 277 | 2 |
| ELEMENT | LIDB RESPONSE | 286 | 4 |
| ELEMENT | OPERATOR SERVICES SYSTEM ACTION | 291 | 2 |
| ELEMENT | METHOD OF INPUT/RESPONSE | 290 | 4 |
| ELEMENT | SEQUENCE CALL COUNTER | 802 | 4 |
|  | TOTAL |  | 58 |
|  |  |  |  |

*FIG. 10*

|  | INFORMATION | TABLE NUMBER | NUMBER OF CHARACTERS |
|---|---|---|---|
| HEADER | MODULE CODE | 88 | 4 |
| MANDATORY | SERVICE TYPE | 606 | 6 |
| MANDATORY | CONNECT TIME | 18 | 8 |
| MANDATORY | ELAPSED TIME | 19 | 10 |
| ELEMENT | OPTIONAL FIELD 1 | 541 | 16 |
| ELEMENT | OPTIONAL FIELD 2 | 541 | 16 |
|  | TOTAL |  | 60 |

*FIG. 11*

BILLING FORMATTER FOR TELEPHONE SYSTEMS UTILIZING INTELLIGENT PERIPHERALS IN ADVANCED INTELLIGENT NETWORK

FIELD OF THE INVENTION

The present invention relates generally to telephone systems, and in particular, to telephone billing systems for central office switches adapted to provide advanced intelligent network (AIN) operations and services.

BACKGROUND OF THE INVENTION

Over the past few years, the number of new services and features offered over enhanced telephone networks has grown. These enhanced telephone networks are known as "Advanced Intelligent Networks" (AINs). Telephony control networks conforming to AIN architecture contain intelligent subsystems for controlling switched traffic and user services such as call waiting, call forwarding, voice announcements, voice response, keyboard response, etc.. These intelligent subsystems, called "Intelligent Peripherals" (IP), are configured for specific regional calling services.

Multi-processor systems used as an AIN system are disclosed in the patent application Ser. No. 08/792,018 by Deborah L. Acker and Thomas E. Creamer and assigned to International Business Machines (IBM) and is incorporated herein by reference.

Accounting and billing for customized telephony services running on an IP requires the assembly of raw billing information, such as, the length of the call, type of service, time of day, etc. that must be communicated to a billing provider. Most billing services such as Bellcore, have specialized formats for example the Bellcore Automatic Message Accounting Format (BAF), to which the raw billing data must be made compatible. Typically the specific data format requirements for these billing service providers are accomplished using dedicated custom software code that converts the raw source billing data (the raw data format) to a specified data target (the billing service data format).

In a telephony billing system where the raw billing data (e.g., source data) can change with the type, brand or even versions of IP, the dedicated custom software code that converts the raw data must be revised. In addition, in telephony billing systems where billing service data format changes (e.g., target data), the dedicated custom software must be revised in this instance as well. Therefore, a need exists for converting the raw source billing data format into the desired target data without having to modify the dedicated custom software code which converts the data.

SUMMARY OF THE INVENTION

Briefly in accordance with the present invention, a billing processing method and system is disclosed for a telephone system comprises at least one central office switching system, wherein a peripheral subsystem is connected to the central office switching systems via a call connection channel. The peripheral subsystem comprises means for providing at least one auxiliary call processing capability via the call connection channel; and the peripheral subsystem comprises means for providing billing information out to a central office communication network. The billing processing method comprises the steps of: (1) receiving raw billing data from the peripheral subsystem; (2) associating the received raw billing data with a formatting object; (3) converting the received raw billing data as specified in the formatting object into a formatted data object; and (4) outputting the formatted data object to the central office communication network.

BRIEF DESCRIPTION OF THE DRAWING(S)

FIG. 8 is an example format process output for Bellcore AMA Format (BAF) billing system structure #116.

FIG. 9 is an example format process output for Bellcore AMA Format (BAF) billing system structure #117.

FIG. 10 is an example format process output for Bellcore AMA Format (BAF) billing system structure #052.

FIG. 11 is an example format process output for Bellcore AMA Format (BAF) billing system structure #118.

DESCRIPTION OF a PREFERRED EMBODIMENT

Figure 1:
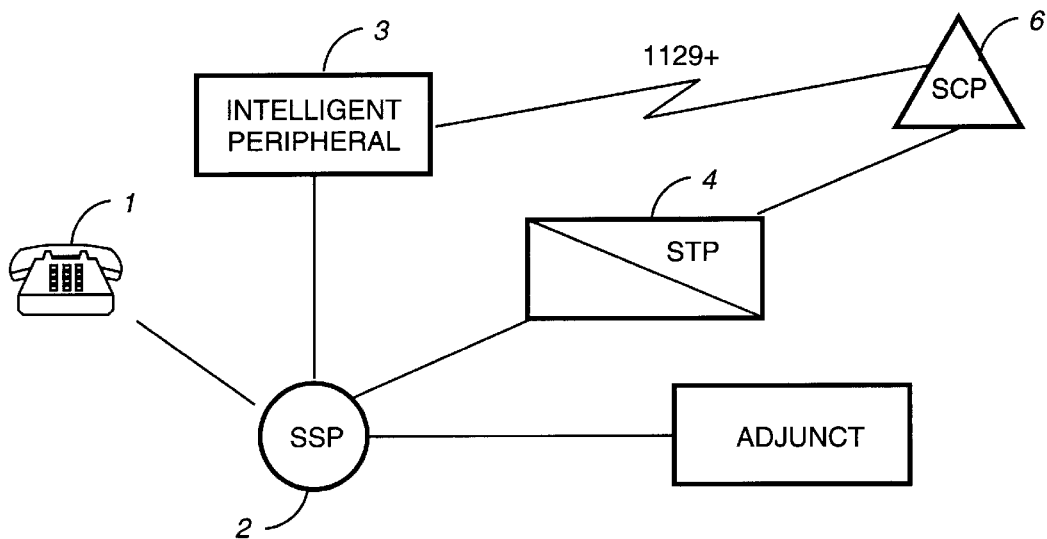
FIG. 1 is a functional block diagram of a telephone network conforming to AIN architecture.

FIG. 1 illustrates a network conforming to public switched telephone network ("PSTN") architectures for advanced intelligent network ("AIN"). Further information about AIN architecture can be obtained by referring to one or more of the following published documents, whose teachings are incorporated herein by reference.

Bellcore, GR-2802-CORE, Advanced intelligent Network (AIN) 0.X Issue 1, Generic Requirements, Issue 2, December 1993.

Bellcore, GR-1129-CORE, Advanced Intelligent Network (AIN) 0.2 switch Intelligent Peripheral Interface (IPI) Generic Requirements, ILC 1E, November 1994.

ISC-IP Interface Specification, Bellcore, SR-3511.

An AIN system is associated with a regional node of the PSTN. Telephone unit 1, available to a "local" PSTN user, links to the regional node through a signal switch points (SSP) complex 2. SSP 2 connects to an intelligent peripheral (IP) system 3, a hierarchical network of signaling transfer points (STPs) 4, and an adjunct system 5.

IP 3 provides switched connections for telephone calls passing through the respective regional node (e.g., between local and trunk lines traversing the node), and controls service applications associated with respective calls (conferencing, voice announcements, speech recognition applications, call forwarding, etc.). SSP 2 supports communications between telephones such as unit 1 and IP 3 using ISDN (Integrated Services Digital Network) connections.

SSP 2 communicates through the STPs with a service control point (SCP) 6, using a known signalling system and SS7 packet-switched message format. The IP 3 and SCP 6 coordinate service logic functions (e.g. functions required to play voice announcements) using a known "1129+" signalling protocol.

Call connections between local telephones such as unit 1 and other local telephones are formed by operations of IP 3 and SSP2. Connections between local telephone 1 and remote telephones associated with remote SSPs and IPs are formed by transmission of call setup messages between SSP2 and the remote SSPs via STP 4 (and other STPs if appropriate) as well as SCP 6 (and remote SCPs if appropriate). Upon determining that a path exists for a required remote call connection, SSP 2 and the other SSPs cooperate with respective IPs to establish the connection.

Message communications, between SSP's such as SSP 2 and both respective IPs such as IP 3 and associated SCPs such as SCP 6, are required to set up call connections and administer telephone user services associated with respective calls. Such message communications are conducted through a common channel signalling (CCS) network formed between the SSPs, the STPs, and the SCPs using the aforementioned SS7 packet switched signalling protocol. The SS7 protocol is used as a network transport layer to facilitate message communication within the CCS network. A regional CCS network, encompassing a region containing the local switching office nearest to the telephone 1 and other switching offices, contains a hierarchy of STPs associated with a hierarchy of SCPs. Each SSP, at local levels nearest to individual user telephones such as 1, connects to two SSPs associated with the respective level. This redundancy is useful to produce high reliability.

Message communications between IPs such as 3 and SCPs such as 6 are conducted in the previously mentioned "1129+" signalling protocol. That protocol enables service logic running on the SCPs to coordinate actions with service logic running on the IPs during delivery of telephone services to telephones such as 1.

Operations of elements 2–6 enable an authorized user of telephone 1 (e.g. the owner of the telephone or an authorized representative of the owner) to administer services to which the owner of the telephone has subscribed (both conventional services, such as call waiting and call forwarding, and new services yet to be defined) without required assistance of operators or other human representatives of the telephone company that interfaces to the telephone.

SSPs are program-controlled telephone switching systems (either access tandem switches or end officers) without local networks connecting to user telephones in a local sub-region. They form local interfaces to the aforementioned CCS network.

SCPs are stand-alone network systems which, in existing intelligent telephony control networks, have been primary focal points for administration of services provided to PSTN users. An SCP can contain service logic and online, real-time database systems. An SCP provides call processing information and instructions in response to queries received through the CCS network.

SCPs support multiple applications, each containing logic defining the handling of individuals calls. After determining actions to be performed in response to a specific query, the SCP sends instructions for handling the respective call back to the SSP that initiated the inquiry. Different services/applications may be offered at different SCPs.

Adjuncts 5 are also stand-alone network systems. They are functionally equivalent to SCPs, but each communicates directly with only one locally associated SSP (whereas SCPs can communicate with multiple SSPs, both within and external to a local region or sub-region). In operation, such adjunct networks enable the development and delivery of telephony services which are not totally reliant on SSPs and SCPs for implementation.

The billing system solution is described in detail in patent application BC9-97-037 by Thomas E. Creamer, Shailesh Gandhi, Peeyush Jaiswal, Pradeep Mansey, and Joan Micheals, for "Flexible Customer Billing Solution For Telephone Systems utilizing Intelligent Peripherals In Advanced Intelligent Network" assigned to International Business Machines (IBM) and is incorporated herein by reference.

Figure 2:
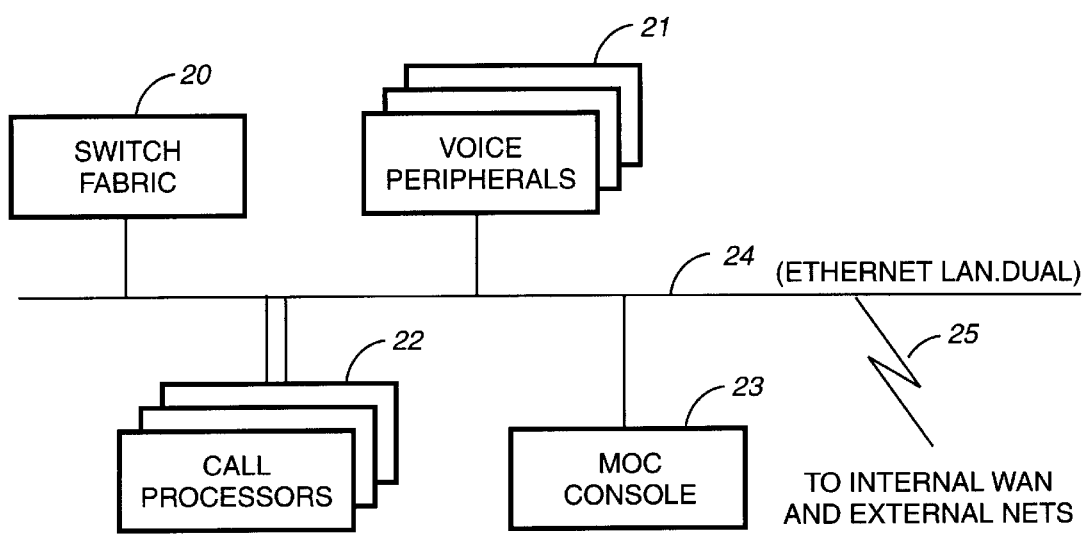
FIG. 2 is a block diagram of the hardware architecture of an intelligent peripheral (IP) system for the network of FIG. 1.
Figure 3:
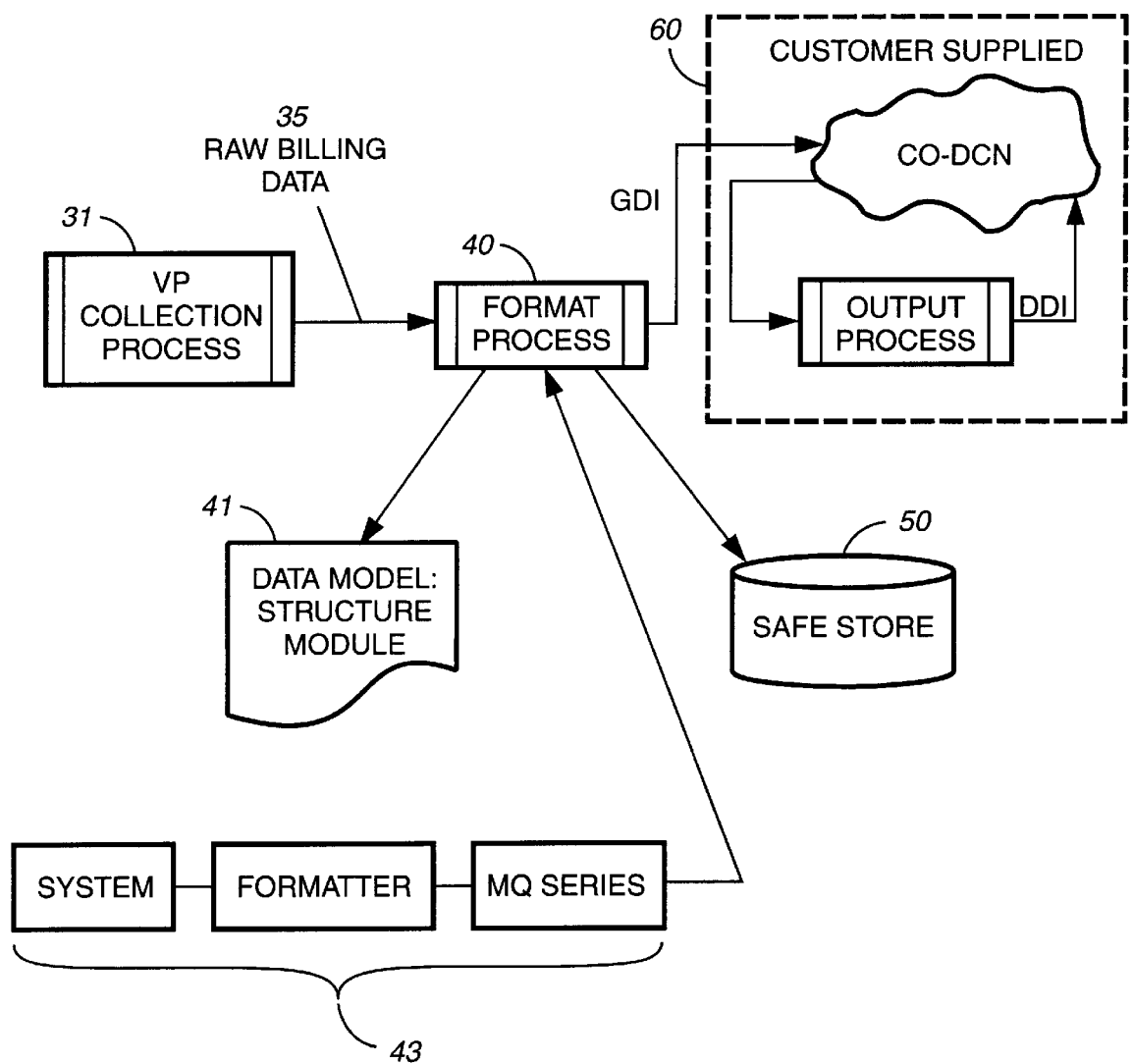
FIG. 3 is a block diagram of the process flow of the billing formatter according to the present invention.

FIG. 2 shows the principal components of the IP system 3 of FIG. 1. IP system 3 is 3 based upon an IBM MSP/6000 system. Standard elements of an MSP/6000 system include a "switch fabric" complex 20, voice peripherals 21, call processors 22, a maintenance and operations console (MOC) processor 23 are all attached via communications link 24. Critical components including voice peripheral processors 21 and call processors 22 are configured redundantly to ensure continuous availability in case of any component failure. Further information on the IBM MSP/6000 system can be found in the patent application entitled "Multi-processor systems used as an AIN system" application Ser. No. 08/792,018 by Deborah L. Acker and Thomas E. Creamer and assigned to International Business Machines (IBM) and is incorporated herein by reference. Customize telephony services running on MSP/6000 include detailed billing, call forwarding, call waiting, voice announcements, voice response, keyboard response, debit card call, detailed billing, peak/off peak charges etc. FIG. 3. illustrates the process for the billing formatter according to the present invention. Each voice peripheral 21 of FIG. 2 runs a collection process to capture the customized service billing parameters called raw billing data. The billing service parameters typically include the type of service, time of day the service was used, the length of time the service was used, the telephone number called, the telephone number of user, etc. The specific parameters are not restricted to any type of format or constituent billing parameters. The present invention contemplates the provider of the customized service may change the format of the raw billing data 35 from time to time. This change will not effect the operation of the present invention.

Raw billing data 35 is outputted from collection process 31 to format process 40. Format process 40 is composed of an IBM RISC System 6000 and contains software programs that receive the raw data from collection process 31 and associates it with a specific billing formatter data structure 41. A set of configuration files 43 separated into three groups—formatter configuration file, system configuration file, MQSeries configuration file—is shown. By editing the configuration files 43, the characteristics of the format process 40 can be changed without the need to modify the format software programs running on format process 40. The output of the format process is sent to the customer supplied billing system 60 in the specified billing system format, such as, the Bellcore AMA Format using AMADNS protocol (GR-1343-CORE, Issue 1, Rev. 1 December 1995).

Formatter configuration file 43 defines the type of billing system format to used, e.g., Bellcore AMA Format (BAF). Other information stored in configuration file 43 includes the number of voice peripherals 21 deployed in the system.

System configuration file 43 is used to configure the hardware and software communications protocols used to send output data to billing system 60. Parameters typical to this file include protocol management information for communication with billing system 60 (e.g. time out responses for handshaking, receive port numbers, block size, re-transmit wait time, etc.).

MQSeries is a Messaging and Queuing Series Family of products from IBM for cross network communication. The MQSeries deployed here is for IBM's AIX operating system. MQSeries configuration file 43 contains information useful to create the queue manager, queues and connections to configure MQSeries objects. Parameters typical to this file includes MSP/6000 information (node number, TCP/IP address, name of queue manager, name of voice peripheral, etc.).

Figure 4:
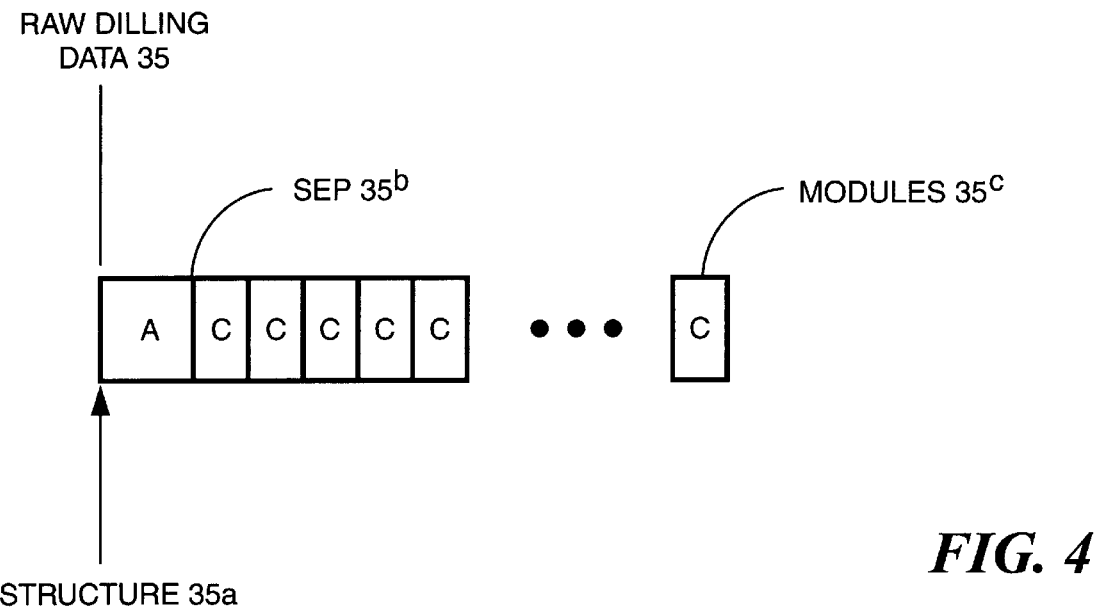
FIG. 4 is an illustration of raw billing data divided into billing records.

The raw billing data 35 of FIG. 3 is transmitted to format process 40 in a series of related data. FIG. 4 is an illustration of raw billing data 35. The raw billing data 35 can be organized in a plurality of ways. In the preferred embodiment, raw billing data 35 is a structure 35*a* separated by a separator tag 35*b* (SEP) followed by zero, 1 or plurality of modules 35*c*. The number of modules in each billing data record varies from zero through n depending on the information transmitted from voice peripheral collection process 31 of FIG. 3.

Figure 5A:
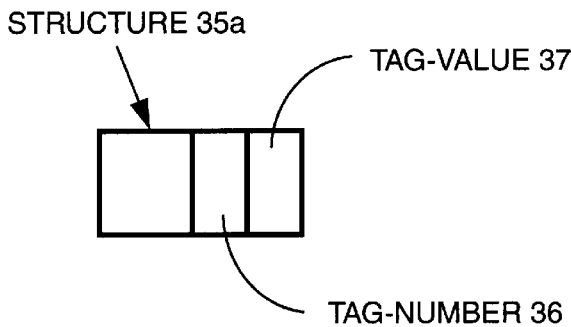
FIG. 5 is an illustration of billing a record with associated tag value and tag_number.
Figure 5B:
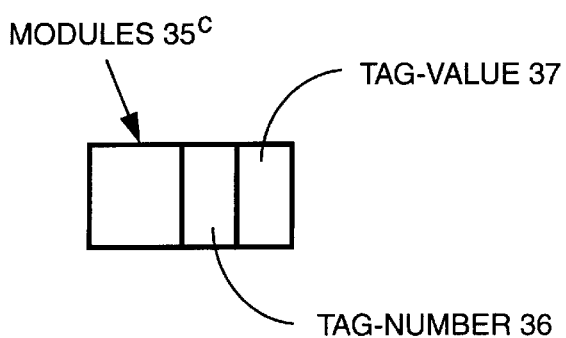

Referring now to FIG. 5, each structure 35*a* and module 35*c* of raw billing data 35 contains a tag_number 36 and tag_value 37. The tag_number 36 is integer number that corresponds to the organization of the raw billing data 35 as mandated by the voice peripheral collection process 31 of FIG. 3.

Figure 6:
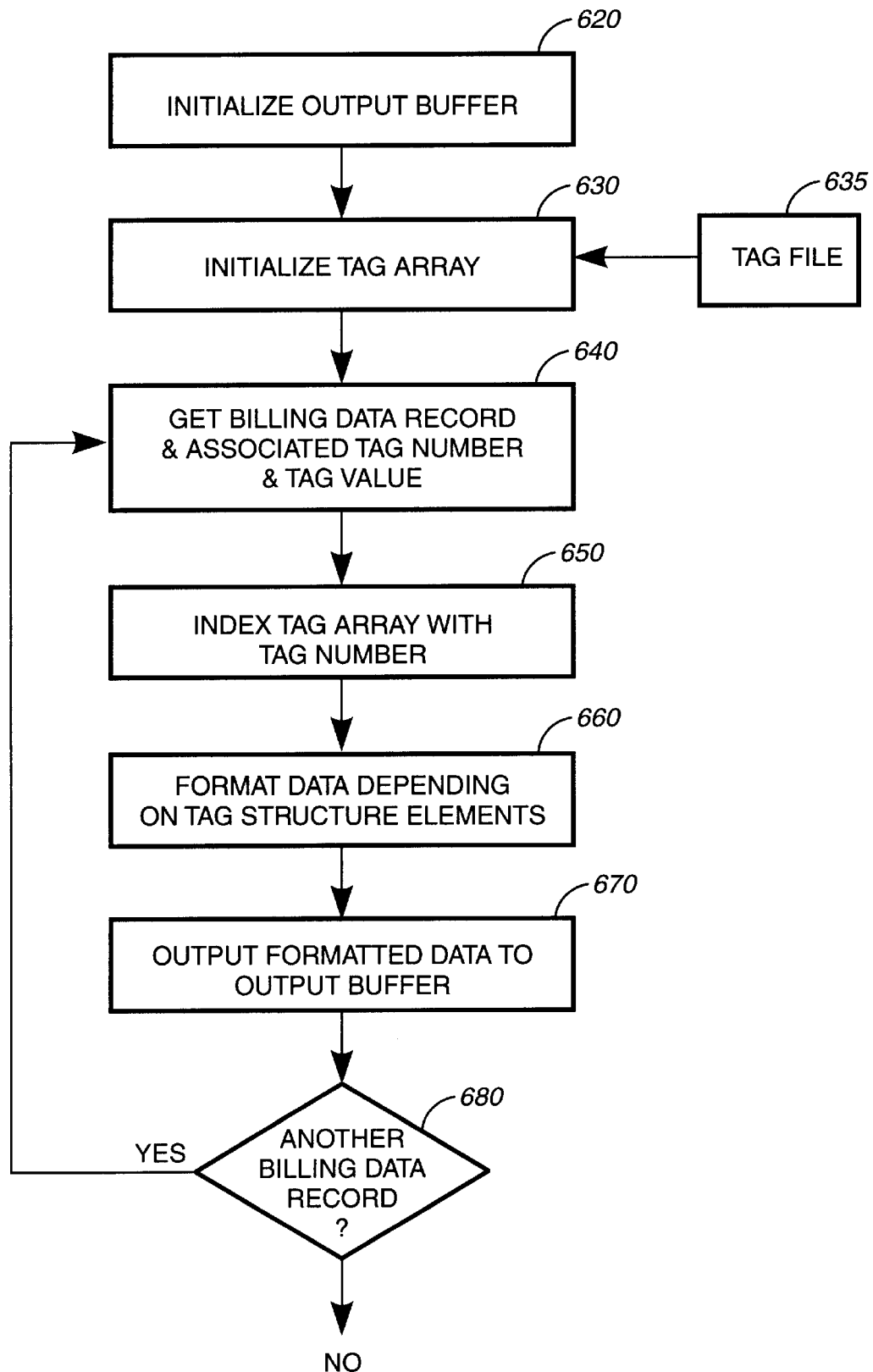
FIG. 6 is a flow diagram of a format process according to the present invention.
Figure 7:
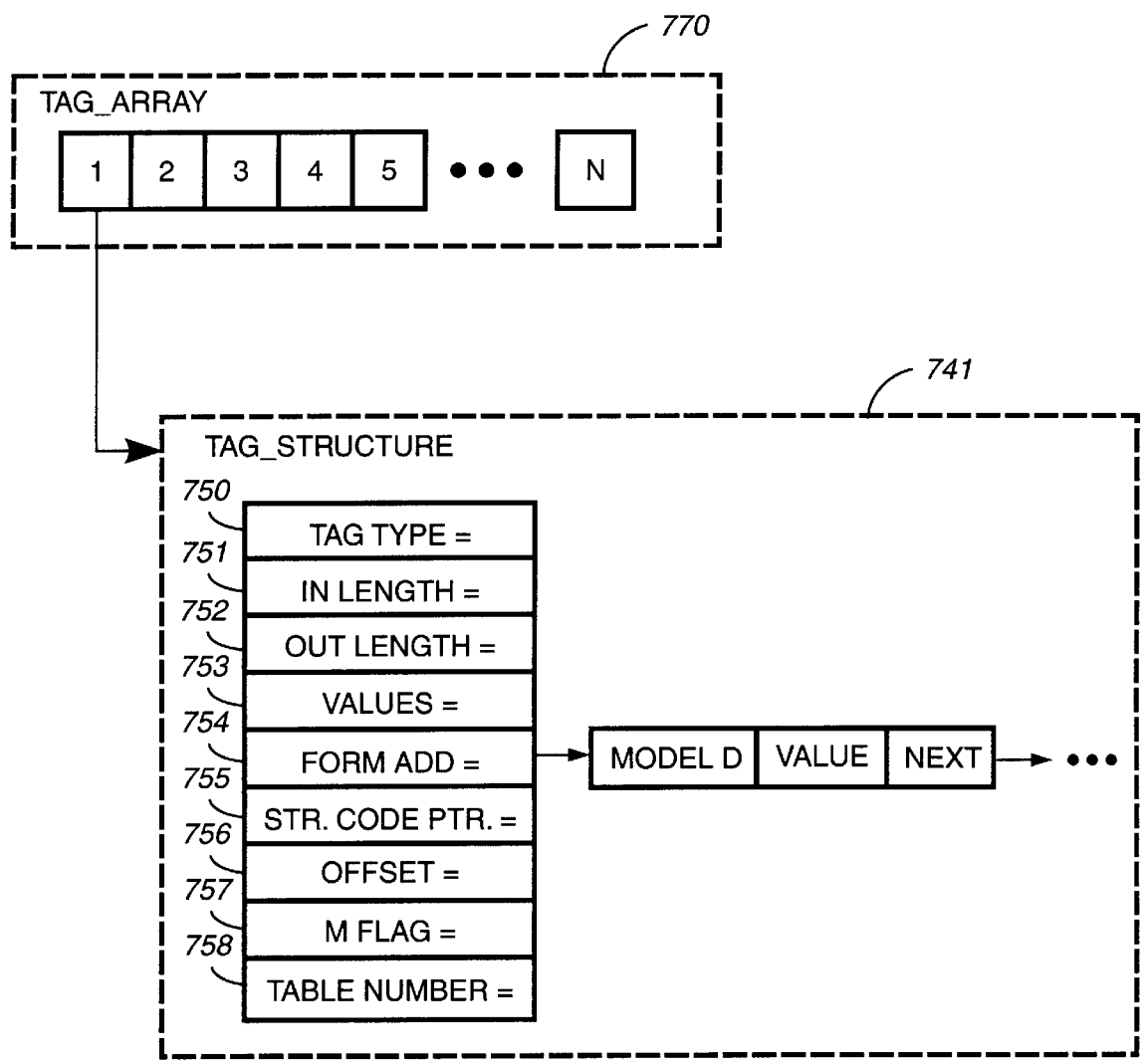
FIG. 7 is a block diagram of a tag_array and tag_array according to the present invention.

FIG. 6 shows the process flow sequence 600 of format process 40. The process begins with the initialization of an output buffer at a specified memory address 620. Next the tag_array is initialized 630. FIG. 7 illustrates a tag_array 740 composed of a series of pointers point to tag_structure 741. Each element 750–757 (i.e. 750, 751, 752, 753, 754, 755, 756, 757, 758) of tag_structure 741 is loaded from an ASCII parameter file called a tag_file 635. Each successive tag_structure 741 referenced in tag_array 740 is serially loaded from tag_file 735 until all the elements 750–758 of all tag_structure 741 are loaded Next step is the process "Get Billing Data Record & Associated Tag Number & Tag Value" 640 reads raw billing data 35 with its corresponding tag_number 36 and tag_value 37 from the voice peripheral collection process 31 of FIG. 3. In step "Index Tag Array With Tag Number" 650 the tag_number 37 is used as an index into the tag_array 740. The index points to a tag_structure 741 that contains information for formatting the raw billing data 35 to a desired output format. Formatting step "Format Data Depending On tag Structure Elements" 660, the tag_structure 741 causes the formatting to change depending on which tag_structure 741 in tag_array 740 is chosen, that is, which tag_structure 741 is indexed by tag_number 36. Possible formatting effects include: (1) the effect of having the formatter insert constant values from a file, such as, values read from the formatter configuration file 43; (2) the effect of invoking a specific routine at an address, specified by a pointer in tag_structure 741. The use of a stored address to a specific routine ensures that custom software modules can be added later in time as necessary without the need to change the base software code running on format process 40; (3) the effect of doing nothing and moving onto the next raw billing data 35; and (4) the effect of inserting tag_value 37 received with the associated tag_number 36 in raw billing data 35 to a desired output format. For example, a tag_value 36 corresponds to the date the telephony service was provided may be represented in an eight bit-wide field, the formatting effect would convert this eight bit wide representation to a desired output format comprising a 4 bit wide field. Alternatively, the formatting effect for tag_value 36 may include the expansion off the number of bits in the representative field from 4 bits to 8 bits by padding the additional requisite bits with a constant logical value.

Next step in the format process "Output Formatted Data to Output Buffer" 670 the tag_structure 741, controls the desired output format. The desired output buffer storage template is specified as an element table_number 758 in tag_structure 741. The desired output format for Bellcore BAF in FIGS. 9, 10, and 11 illustrates a variety of output formats for Bellcore BAF. The desired output format is specified as an element in tag_structure 741.

It should be understood that editing the configuration file 43 will cause the formatter processor 40 to behave differently depending on what values are loaded during initialization into tag_array 740 (see FIG. 7). This allows the customization of formatter processor 40 without the need to change to formatting source code.

In another embodiment, the format processor 40 in FIG. 3 beside sending the formatted output buffer to the customer supplied billing system, the output buffer is written to a safe storage system 50 as well. The storage system will keep the formatted output for a selectable period of time, such as a 5 to 30 business days for retransmission of the formatted output if the customer supplied billing service 60 is temporarily unavailable or is being serviced.

While the invention has been illustrated and described in the preferred embodiments, many modifications and changes therein may be affected by those skilled in the art. It is to be understood that the invention is not limited to the precise construction herein disclosed. Accordingly, the right is reserved to all changes and modifications coming within the true spirit and scope of the invention.

We claim:

1. In an Advance Intelligent Network (AIN) comprising at least one central office switching system, wherein a peripheral subsystem is connected to said central office switching system, via a call connection channel, said peripheral subsystem comprising means for providing at least one auxiliary call processing capability via said call connection channel; and said peripheral subsystem comprising one or more voice peripherals for providing billing information over the AIN to a third party billing system; a billing processing method comprising the steps of:

receiving raw billing data from one or more voice peripherals;

associating said raw billing data with a formatting object;

converting said raw billing data as specified in said formatting object into a formatted data object; and outputting said data object to said third party billing system via the AIN.

2. The billing processing method of claim 1, wherein said step of outputting of said data object to said central office communication network includes parallel output of said data object to a local storage medium.

3. The billing processing method of claim 1, wherein said step of converting of said raw billing data as specified in said formatting object into a formatted data object which is compatible with Bellcore Automatic Message Accounting format.

4. In an Advance Intelligent Network (AIN) comprising at least one central office switching system, wherein a plurality of peripheral subsystems are connected to said central office switching systems via a plurality of call connection channels, at least one group of said peripheral subsystems comprising one or more voice peripherals for providing billing information over the AIN to a third party billing system; a billing processing method comprising the steps of:

selecting one or more voice peripherals from one of said group of peripheral subsystems as source voice peripherals to provide billing information;

receiving raw billing data from said source voice peripherals;

associating said raw billing data with a formatting object;

converting said raw billing data as specified in said formatting object into a formatted data object; and outputting said data object to said third party billing system via the AIN.

5. The billing processing method of claim 3, wherein said outputting of said data object to said central office communication network includes parallel output of said data object to a local storage medium.

6. The billing processing method of claim 3, where in said converting of said raw billing data as specified in said formatting object into a formatted data object which is compatible with Bellcore Automatic Message Accounting format.

* * * * *